Nov. 29, 1960 E. M. PURCELL 2,962,636

MAGNETIC FILTER

Filed July 22, 1955 5 Sheets-Sheet 1

INVENTOR.
EDWARD M. PURCELL
BY John W. McLaren
ATTORNEY

Nov. 29, 1960 E. M. PURCELL 2,962,636

MAGNETIC FILTER

Filed July 22, 1955 5 Sheets-Sheet 2

INVENTOR.
EDWARD M. PURCELL
BY John W. McLaren
ATTORNEY

Nov. 29, 1960 E. M. PURCELL 2,962,636

MAGNETIC FILTER

Filed July 22, 1955 5 Sheets-Sheet 3

INVENTOR.
EDWARD M. PURCELL
BY John W. McLaren
ATTORNEY

INVENTOR.
EDWARD M. PURCELL
BY John W. McLaren
ATTORNEY

Nov. 29, 1960 E. M. PURCELL 2,962,636
MAGNETIC FILTER
Filed July 22, 1955 5 Sheets-Sheet 5

INVENTOR.
EDWARD M. PURCELL
BY John W. McLaren
ATTORNEY 2,962,636
Patented Nov. 29, 1960

2,962,636

MAGNETIC FILTER

Edward M. Purcell, Middlesex County, Mass., assignor to The Perkin-Elmer Corporation, Norwalk, Conn., a corporation of New York Filed July 22, 1955, Ser. No. 523,701
14 Claims. (Cl. 317—158)

This invention is concerned with producing a highly uniform magnetic field. The two principal types of magnetic field uniformity of especial concern are uniformity of a magnetic field with respect to space, which may be designated as homogeneity; and uniformity of a magnetic field with respect to time, which may be designated as stability. Both types of uniformity may be of great importance in instruments and apparatus as will be explained more fully hereinafter.

More particularly, the present invention is directed to a novel pole cap assembly which, when interposed in a magnetic field or utilized in combination with a magnetomotive source, greatly improves the homogen ity of the magnetic field adjacent its face. In accordance with an equally important aspect of the present invention, two such pole cap assemblies may be arranged on opposite sides of an air gap, with one of the pole faces resiliently held in precise spaced relation to the other. The present invention also embodies a feature by means of which certain troublesome effects of the fringe magnetic field are virtually eliminated.

Instrumentation which affords the study of nuclear magnetic phenomena, for instance, may require a magnetic field of extraordinary qualities, which are most difficult to achieve by customary means. A typical instrument may require a magnetic field having a strength of the order of 5000 gauss, stability of less than 0.001 gauss change per minute, and homogeneity of better than 0.001 gauss over a region a few tenths of an inch in size. Generally speaking, higher resolution instrumentation will require finer uniformity of the magnetic field used, both as to homogeneity and stability.

For many purposes, the high degree of homogeneity may be required only within a relatively small volume of the magnetic field, but the requirement is still difficult to attain, particularly with the high intensity field and the exacting order of stability required.

Electromagnets may be readily designed which produce highly intense magnetic fields having comparatively rather good homogeneity, though not usually meeting the stringent standards set out hereinbefore as typical of the order of homogeneity which may be desirable for use in connection with nuclear magnetic instrumentation.

Moreover, the stability of a magnetic field produced by an electromagnet is so intimately dependent upon the current passing through its coils that extremely minute changes due to any irregularities in current values, including infinitesimal transient fluctuations, can produce instability which, though scarcely discernible, renders the magnetic field unsatisfactory for high resolution nuclear magnetic resonance investigations. Accordingly, it is usually necessary to employ elaborate control circuits in conjunction with an electromagnet to achieve acceptable stability.

Improved materials capable of being permanently magnetized have, in recent years, made it possible to produce magnetic fields of high intensity from permanent magnets. Permanent magnets provide magnetic fields having a relatively very high order of stability as compared with fields produced by electromagnets, if moderate care is taken to avoid rapid changes in the temperature of the magnetic material. However, the fields produced by permanent magnets are generally somewhat less homogeneous than those produced by electromagnets. In the investigation of nuclear magnetic phenomena, to return to the original example cited, higher orders of resolution demand further perfection of the stability and homogeneity of the magnetic fields used, as well as the fundamental requirement of a highly intense magnetic field, and in the past the homogeneity and stability of the magnetic field has been one of the most crucial determinative factors of the orders of investigative resolution and accuracy attainable.

The present invention is directed to significantly improving the uniformity, and particularly the homogeneity of magnetic fields, and though in some preferred embodiments permanent magnets may be employed advantageously, there is no inherent limitation in the concept of the present invention which so limits its usefulness.

A better understanding of the concept, principles and operation of the present invention may be had by reference to the accompanying drawings in which, Fig. 1 is an isometric view of a section through a pole cap assembly constructed in accordance with the teaching of the present invention;

Figure 1:
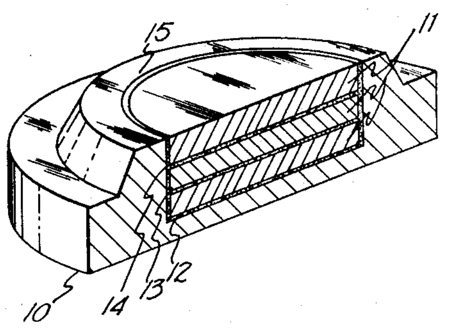

To improve the homogeneity of a magnetic field, the present invention contemplates minimizing the major sources of non-uniformity by the use of unique apparatus and novel combinations of known components of apparatus.

Firstly, in accordance with the present invention, the lack of uniformity of the magnetic field due to the nonhomogeneity of the magnetomotive source is greatly reduced by the use of a pole cap assembly of novel construction which performs a smoothing and attenuating function that may aptly be described as "magnetic filtering."

Secondly, at least one of the pole cap assemblies associated with the gap wherein it is desired to effect a highly uniform magnetic field has a "floating" filter element which is arranged to be resiliently held in exact spaced relationship with the other pole cap face to effect greater homogeneity.

Thirdly, in addition to the positioning afforded by the floating element, alignment of the pole cap faces and preservation of their accurate geometry is facilitated by the provision of a peripheral magnetic guard ring which is coextensive with the pole cap face and conducts substantially all the flux of the fringing field, thereby eliminating from the floating pole caps themselves the mechanical stresses, ordinarily quite large, which are associated with the inhomogeneous fringing field.

Additionally, the pole cap assemblies of the present invention are so conceived and constructed as to be readily adaptable to machining techniques for finishing the faces to a precise degree of flatness typical of ground optical surfaces. A higher degree of flatness of opposing pole faces aids in insuring their being exactly equidistant at all points when appropriately positioned on either side of a gap, thus enhancing the homogeneity of the magnetic field therebetween.

The goal at which the above-mentioned improvements are aimed is the creation of flat parallel surfaces of constant magnetic potential at the opposing pole faces. This condition, if perfectly achieved, would still not result in a perfectly homogeneous field within the gap, because the pole faces are not infinite in extent. Nevertheless, the residual symmetrical inhomogeneity caused by the finite extent of the pole faces will be small enough to be tolerable in many applications. For example, calculations show that in the gap between magnetic equipotential flat-faced cylindrical poles whose diameter is only four times the gap width, the field in the central region is uniform to approximately one part in one million over a spherical volume of diameter equal to one fourth the gap width.

Furthermore, this slight remaining inhomogeniety can be readily removed by any one of several means, such as: (*a*) a pair of small auxiliary coils, on or near the pole faces, carrying a suitable adjusted small current; or (*b*) the so-called "Rose-shim" method, in which the pole faces are provided with raised rims. In the pole cap here described, this could be accomplished simply by sinking each floating pole cap 90 (Fig. 9) deeper in the cavity in the guard ring 93, so that the lip of the guard ring projects a suitable distance beyond the plane of the cap face. Method (*a*) has the advantage of greater flexibility and ease of adjustment, as compared to (*b*) because a shim of different thickness is required to compensate for inhomogeneity at each variation of field strength which may be encountered. Consequently, even slight changes in field strength require a change in shims to one of appropriate thickness to compensate properly for inhomogeneity. On the other hand, the former system (*a*) affords significantly greater adaptability through the convenient expedient of regulating the amount of current flowing through electrically conducting coils adjacent the gap.

A combination of the two methods might also be advantageous. In any case, it is believed that the achievement of the primary purpose of the present invention, i.e., the maximum homogeneity of magnetic field through the greatest volume possible, is much more readily attained by accurate control of the field configurations adjacent the surfaces of magnetic equipotential.

The magnetic filter action by which the present invention greatly improves homogeneity is achieved by a component part of the pole cap assembly which comprises a plurality of alternate sections of high and low magnetic permeability. In one of its simplest forms, the magnetic filter may be a number of iron discs, for instance, spaced so as to have gaps therebetween. Alternate sections of high and low permeability may also take the form of ferromagnetic sections bonded together in laminated fashion by the use of a bonding material which has a substantially higher reluctance than the ferromagnetic sections. The bonding material thereby constitutes a comparatively high reluctance portion of the path coursed by magnetic flux lines which are normal to the plane of lamination.

Fig. 1 is a sectional isometric view of the construction of a pole cap assembly illustrating features of the present invention. The pole cap assembly is comprised of a base 10 and a plurality of sections 11 which are all of relatively high permeability and may be of ferromagnetic material, for instance. The base 10 is recessed to receive the sections 11 which are maintained in spaced relationship with respect to each other. In Fig. 1 the pole cap assembly is illustrated as having ferromagnetic sections 11 bonded within the pole cap base 10. The bonding material 12 is of significantly higher reluctance than the discs 11, and the layers between the discs 12, 13 and 14 therefore form sections of substantially higher reluctance when interposed in a magnetic circuit so that the magnetic path is normal to the layers. The base 10, it will be noted, has a magnetic guard ring 15 comprised of an annular peripheral portion which is coextensive with the topmost of the alternate layers of high and low permeability imbedded within the pole cap assembly.

Figure 2:
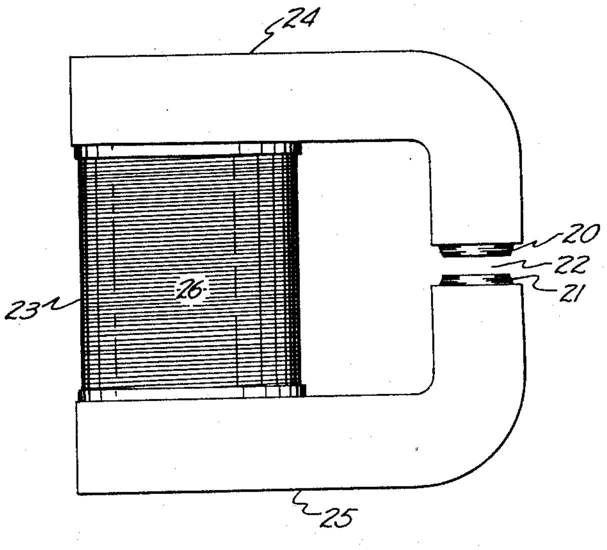
Fig. 2 is an elevational view of a magnetic circuit embodying pole cap assemblies of the present invention.

A pole cap assembly substantially as that shown in Fig. 1 is positioned adjacent to the gap in a magnetic circuit wherein it is desired to have a homogeneous magnetic field. Thus, in a magnetic circuit of the form shown in Fig. 2, such a pole cap assembly is shown on either side 20, 21 of the gap 22. In Fig. 2 a magnetomotive source 23 is shown as being positioned between two L-shaped arms 24 and 25 which form a relatively low reluctance path for the magnetic flux produced by the magnetomotive source 23. The magnetomotive source 23 may be a permanent magnet made of material such as Alnico permanently magnetized by the coils of a winding 26 wound thereabout; or, the magnetomotive source 23 may be an electromagnet, comprised of a soft iron core and a coil wound thereabout and connected to a source of electrical power.

The pole cap assembly of the present invention may be interposed in any one of a number of forms of magnetic circuits to homogenize the magnetic field of a gap therein, and it should be noted also that the pole cap assembly of the present invention may be used in conjunction with several types of sources of magnetomotive force. Referring to Fig. 1 again, it may be seen that magnetic flux which courses a path normal to that of the laminations 11, 12, 13 and 14 of the filter section, for instance, are caused to traverse sections of the pole cap assembly which are alternately of substantially different orders of reluctance, i.e., ferromagnetic sections 11 provide a highly permeable medium for the magnetic flux while the bonding material 12, 13, and 14 between layers of the ferromagnetic sections 11 are paths of relatively high reluctance. Equivalent high reluctance paths between ferromagnetic sections may be effected by the use of brass plates or other suitable nonmagnetic materials.

The principle by which the pole cap assembly of the present invention operates upon a magnetic field adjacent its face to significantly improve its homogeneity is believed to be due to an action of the alternate sections of high and low permeable materials in the pole cap assembly acting upon the magnetic field in a fashion which may be likened for purposes of explanation to the action of a passive filter network which smooths electrical energy passing therethrough by means of shunt and serially connected electrical impedances. Thus, the magnetic filtering action of the laminated pole cap of the present invention may be explained by an electrical analogy.

Figure 3:
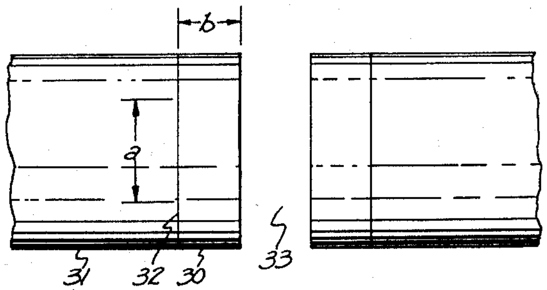
Fig. 3 is a one-piece solid pole cap.

As shown in Fig. 3, it may be assumed for purposes of explanation that a pole cap 30 of ferromagnetic material is positioned adjacent a magnetomotive source 31, such as a permanent magnet made of Alnico.

It may further be assumed that at the surface 32 of the magnetomotive source 31 which is in contact with the pole cap 30 a difference in magnetic potential exists between two points separated by a distance $a$, as shown in Fig. 3. The amount of smoothing or filtering of the nonhomogeneity in the magnetomotive source achieved by the solid one-piece pole cap 30 may be likened to a magnetic circuit represented by Fig. 4 in which the conventional symbols for resistance are analogous to reluctance. Thus, if V is magnetic potential, so to speak, $$\frac{\Delta V'}{\Delta V}$$

is the ratio of the difference of the magnetomotive intensity between two points separated by a distance $a$ on the face of the pole cap adjacent the gap 33, as compared to the difference in the magnetomotive intensity between two points separated by distance $a$ at the base 32 of the pole cap in contact with the magnetomotive source 30. The expression $$\frac{\Delta V'}{\Delta V}$$

thus may be considered to be the filtering or attenuation factor of the pole cap 30.

Figure 4:
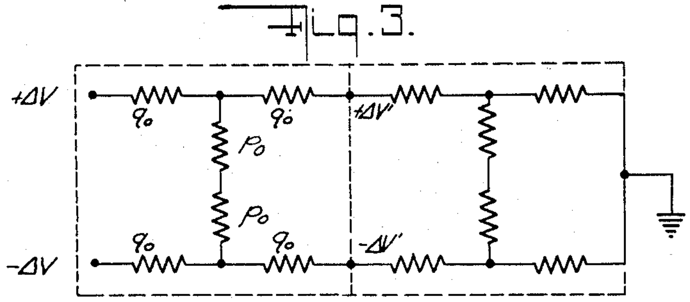
Fig. 4 is a schematic representation of magnetic parameters of the pole cap of Fig. 3 analogized to electrical parameters.

The schematic representation of Fig. 4 applies to a solid pole cap having a single thickness as shown at 30 in Fig. 3. If, however, the pole cap 30 is conceived as an assembly comprised of $n$ sections of thickness $$\frac{b}{n}$$

separated by $n-1$ air gaps of thickness $$\frac{\alpha b}{n}$$

a somewhat more complex extension of the electrical magnetic analogy obtains. To introduce a simplified symmetry, an air gap may be added at each end of the thickness $$\frac{\alpha b}{2n}$$

one of these gaps being actually part of the main gap in which it is sought to have a highly homogeneous magnetic field. Since substantial symmetry between the upper and lower halves of the filter may be validly assumed, the laminated portions of a pole cap assembly may be schematically represented in accordance with the analogy as shown in Fig. 4.

Figure 5:
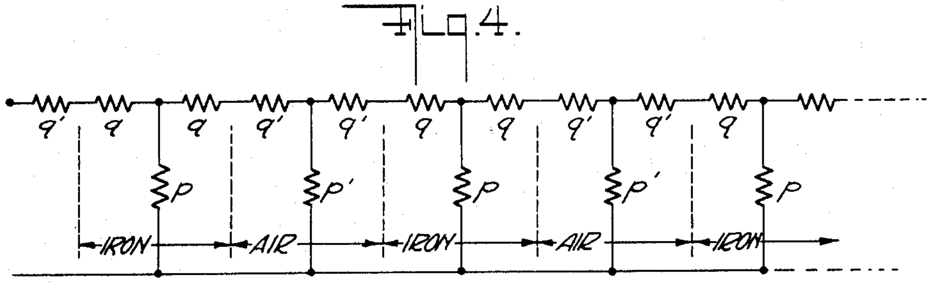
Fig. 5 is an analogized schematic representation of the magnetic parameters of a pole cap assembly constructed in accordance with the present invention.

In most cases of interest, $q'>q$, and $p'\gg q'$. The shunt elements of $p'$, as well as $q$ compared to $q'$, therefore have such little effect that they need not be taken into account and the filter action of such a pole cap structure may be represented as shown in Fig. 5. In this particular schematic illustration, $n=3$; that is to say, that the number of discrete sectional elements of the pole cap assembly which perform the filtering action are three in number, as illustrated in Fig. 1, for instance.

Figure 6:
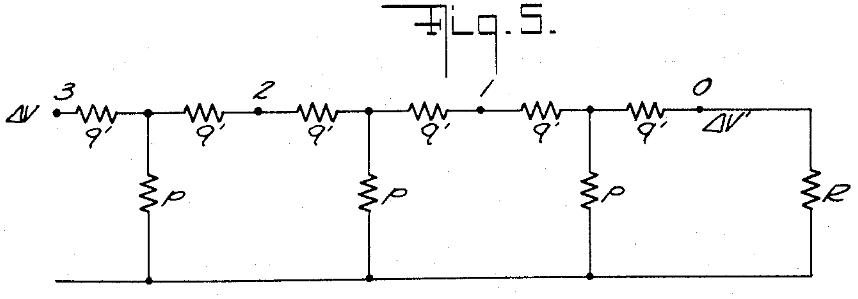
Fig. 6 is a simplified schematic representation of the magnetic parameters of an embodiment of the present invention.

R is the main gap reluctance which is relatively so high that it can be considered to be infinite in calculating the action of the magnetic filter. The attenuation of the first section of the filter between 0 and 1 of Fig. 6 is $$\left(\frac{p}{q'+p}\right)$$

From that point on the magnetic filter is so nearly matched that the effect per section may be calculated as if it were matched. This may be expressed as $$\frac{\sqrt{1+2p/q'}-1}{\sqrt{1+2p/q'}+1}$$

and thus, $$\frac{\Delta V'}{\Delta V}\left(\frac{p}{q'+p}\right)\left[\frac{\sqrt{1+2p/q'}-1}{\sqrt{1+2p/q'}+1}\right]^{n-1}$$

Under most conditions $q'\gg p$, if there are not too many laminations and $$\frac{\Delta V'}{\Delta V}=\left(\frac{p}{q'}\right)\left(\frac{p}{2q'}\right)^{n-1}=2\left(\frac{p}{2q'}\right)^{n}=2\left(\frac{n^2a^2}{2\mu\alpha b^2}\right)^{n}$$

where, $\mu$=permeability, and $\alpha b$=total thickness of intersection air gaps. Thus, it may be seen that maximum attenuation, for fixed $b$, $\mu$, and $\alpha$, is attained for $$n=\frac{1}{e}\cdot\frac{b}{a}\sqrt{2\mu\alpha}$$

and is $2e^{-n}$. Note that $a$ is essentially a measure of the lateral scale of inhomogeneity which it is desired to filter out. It may be seen therefore that there is a most desirable order of attenuation in the gradation of magnetomotive intensity between two points in a magnetic field when a magnetic filter is interposed in the magnetic field in accordance with the concept of the present invention causing the magnetic flux to course a path generally normal to the laminations which comprise alternate sections of the magnetic circuit having substantially different orders of reluctance.

Figure 7:
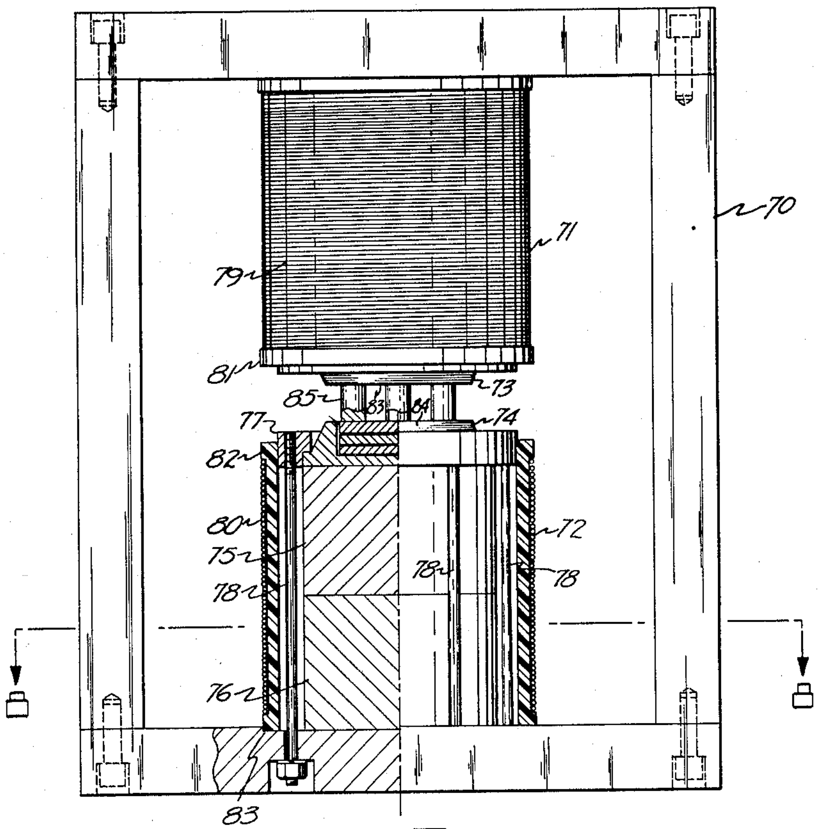
Fig. 7 is an elevational view of a preferred embodiment of the present invention.
Figure 8:
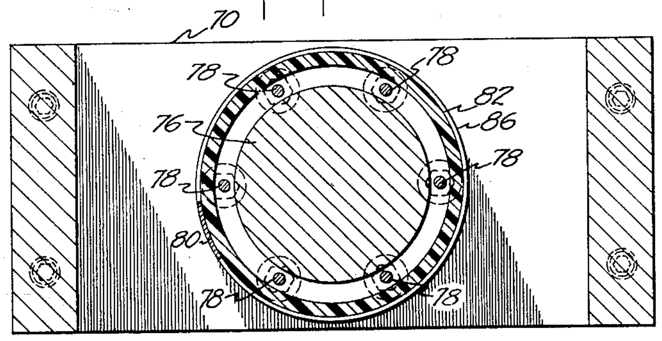
Fig. 8 is a cross-sectional view of the embodiment of Fig. 8 taken through A—A.

Figs. 7 and 8 are illustrations of an embodiment of the present invention wherein opposed magnetomotive sources are positioned within a rectangularly shaped yoke and the pole caps of the present invention are affixed to the magnetomotive sources adjacent the gap therebetween.

Fig. 7 is an elevational view of this embodiment of the present invention, while Fig. 8 is a cross-sectional view taken through 8—8. The rectangularly shaped yoke 70 has two magnetomotive sources 71 and 72 affixed to it in opposed, aligned relationship. Each of the magnetomotive sources 71 and 72 is abutted with a pole cap assembly 73 and 74, respectively. The general structure of the magnetomotive sources 71 and 72 may, of course, take a number of forms.

As has been previously mentioned, the magnetomotive source need not be a permanent magnet, but if a permanent magnet is used and a high intensity field is desired, the magnet is necessarily quite large. Since there is a practical limit as to the size of high quality permanently magnetizable material which may be obtained, a large permanent magnet may be cast in several sections 75 and 76 and positioned in stacked relation as shown in the embodiment of Fig. 7. In this particular embodiment, generally cylindrically shaped sections 75 and 76 of permanently magnetizable material, such as Alnico, are employed. The sections 75 and 76 are placed adjacent each other and held in place by the pole cap assembly 74 and a cap ring 77 which is structurally supported from the yoke 70 by a plurality of rods 78 of nonmagnetic material, such as stainless steel.

The magnetomotive source assemblies 71 and 72 each has associated with it a generally helically wound coil as shown at 79 and 80, respectively, on a nonmagnetic form 81 and 82, which may be made of Bakelite or a similar material. The coil forms 81 and 82 are dimensioned so as to fit slidingly over the magnetomotive source assemblies 71 and 72 previously described. A section of the yoke immediately beneath each magnetomotive source assembly may be recessed as shown at 83 so as to more firmly position the magnetomotive source 70 in the yoke.

The helically wound coils 79 and 80 shown in the embodiment of Fig. 7 are initially used to permanently magnetize the core material. After the core material has been permanently magnetized, the coils 79 and 80 may perform the ancillary function of effecting slight linear changes in the strength of the order of 5000 gauss, for instance, the intensity of the field may be linearly and accurately varied within the range of the order of 50 gauss by this means.

An embodiment of the present invention which utilizes an electromagnet source may be quite similar in structure to that shown in Fig. 7, the most significant difference perhaps being that the stacked sections 75 and 76 of permanently magnetizable material would be replaced by a soft iron core. The magnetomotive source would be the soft iron core energized by a coil wound thereabout on a spool or form substantially as that shown at 81 and 82 in Fig. 7.

The two magnetomotive sources 71 and 72 shown in Fig. 7 are for all practical purposes symmetrical and in opposed position so that the pole cap assemblies 73 and 74 and their respective faces 83 and 84 are precisely aligned. It will be noted that between the faces 83 and 84 there are a number of spacers 85 in the air gap wherein it is desired to have a highly homogeneous field. The spacers 85 may be of any suitable nonmagnetic material, such as quartz, for instance, and are of precisely the same lineal dimensions so as to maintain the pole faces 83 and 84 of the two pole cap assemblies 73 and 74 equidistant at all points.

In accordance with the teaching of the present invention, at least one of the pole cap assemblies 73 or 74 shown in Fig. 7 has a movable magnetic filter section resiliently held in place so as to be urged toward the other pole cap assembly. This is shown in more detail in Figs. 9 and 11.

Figures 9, 10:
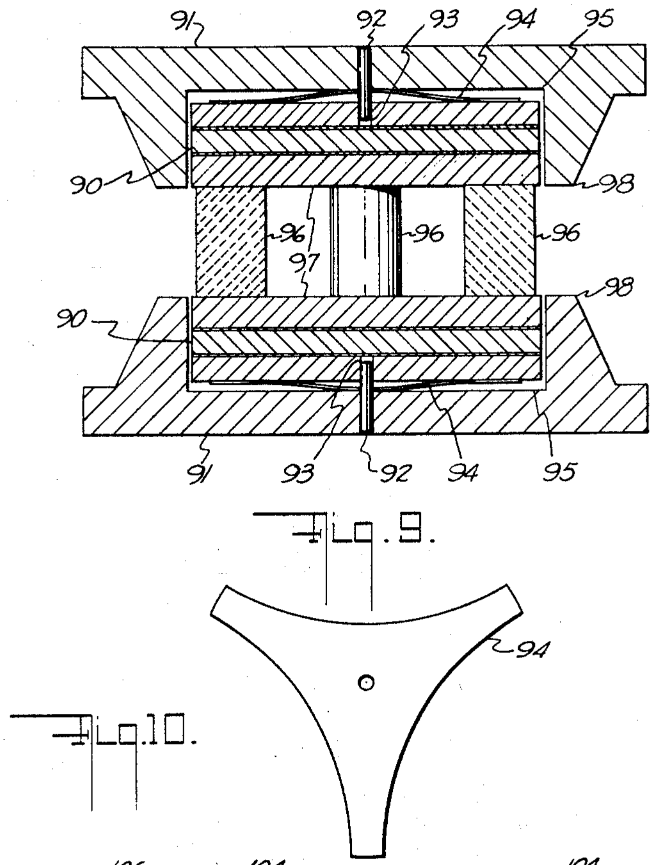
Fig. 9 is a cross-sectional view of a pair of pole cap assemblies embodying the present invention.
Fig. 10 is an illustration of one type of spring means which may be used in a pole cap assembly embodying the present invention.

Fig. 9, for instance, shows the filter sections 90 of both pole cap assemblies 91 as being movable within the assembly and held in alignment therein with a pin 92 which forms a sliding fit with a recess 93 in each of the laminated filter sections 90. The resilient action may be obtained by the use of a spring 94 made of any suitable nonmagnetic material and positioned at the base of the pole cap recess 95, as shown. The spring 94 may be made of beryllium copper, for instance, and may take the form shown in Fig. 10.

Thus, it may be seen that either one or both of the magnetic filter sections 90 of the magnetic pole cap assemblies 91 being movably mounted, and resiliently urged toward the other with precisely sized spacers 96 between pole faces 97 assures that all points of the faces 97 of the pole cap assemblies are exactly equidistant. This is one of the important factors in assuring that the magnetic field between such pole faces is uniform and homogeneous throughout.

It will be noted that the pole cap assemblies 91 have a base which is recessed 95 to receive the magnetic filter sections 90 and peripheral annular magnetic guard rings 98 which run thereabout perform the function of eliminating undesirable distorted magnetic fields adjacent the rim of the magnetic filter sections 90, thus obviating the troublesome magnetic forces which may otherwise be exerted on the pole faces.

Figure 11:
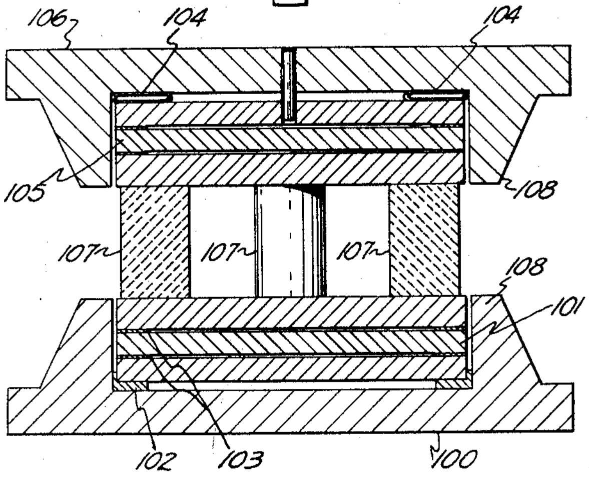
Fig. 11 is a cross-sectional view of a pair of pole cap assemblies embodying the present invention.

Fig. 11 illustrated, as has been mentioned previously, one of the pole cap assemblies 100 as having a magnetic filter section 101 which is fixed therein. It is apparent, of course, that the plurality of sections of highly permeable material which, together with alternate sections of high reluctance material, form the magnet filter, need not necessarily be bonded by a solid layer of bonding material as disclosed in some of the other embodiments herein. The spacing material may be merely an annular section of nonmagnetic material 102 or symmetrically positioned shims 103, as shown in Fig. 11. Similarly, pole cap assemblies constructed in accordance with the teaching of the present invention may have a movable magnetic filter element resiliently mounted therein by a number of means other than a metallic spring. As shown in the upper pole cap assembly of Fig. 11, pneumatic pressure as afforded by a small bladder element 104 may be utilized to resiliently urge the movable magnetic filter element 105 of the pole cap assembly 106 toward the oppositely aligned pole face. Other variations of such resilient means may take the familiar form of an O-ring, for instance, of elastic material utilizing the resiliency of the O-ring itself or combined with the cushioning resiliency of a volume of air sealed by the O-ring.

Thus, it may be seen that the present invention accomplished smoothing and filtering of magnetomotive energy by the attenuation afforded through an alternatively high and low reluctance path for magnetic flux adjacent the gap wherein an extremely homogeneous field is desired. Additionally, by providing a "floating" pole face action and accurately dimensioned spacers 96 and 107, opposed pole faces may be precisely positioned and aligned so as to assure not only coaxial alignment but equidistant spacing of every point thereon within a high order of precision. The annular peripheral portions 98 and 108 of the pole cap assemblies which are substantially coextensive with the magnetic filter elements, correct the distortion of magnetic fields at the rims of the pole faces, eliminating the undesirable effects which may otherwise be present.

Figure 12:
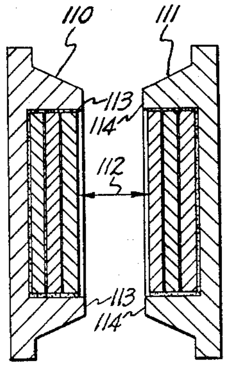
Fig. 12 is an illustration of shims used to compensate for slight inhomogeneity of the magnetic field in an air gap.

As mentioned previously, the relatively minor lack of homogeneity which exists in the gap because the extent of the pole faces is not infinite may be corrected by providing that the magnetic guard ring of the present invention extend slightly beyond the principal plane of the pole face assembly. Fig. 12 illustrates pole face assemblies 110 and 111 arranged on either side of a gap 112. The principal planes of the pole cap assemblies 110 and 111 extend slightly less into the gap than their respective magnetic guard rings 113 and 114. The magnetic guard rings 113 and 114 may therefore be regarded as including an integral shim section which acts upon slight inhomogeneities of the magnetic field in the gap 112 to compensate for the finite dimensions of the pole cap faces.

Figure 13:
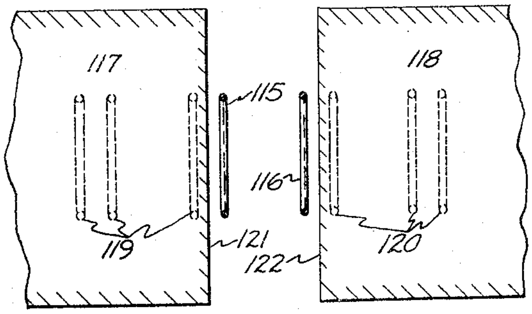
Fig. 13 is an illustration of the magnetic effect of electrically conducting coils placed adjacent an air gap.

Another way in which comparable results may be accomplished is illustrated in Fig. 13 in which an electrically conducting coil of single convolution is shown adjacent each side of the gap wherein it is desired to have a highly homogeneous magnetic field. The coils 115 and 116 are seen to create magnetic images of themselves within the pole pieces 117 and 118 as indicated by the broken-line representations of such coils, 119 and 120.

Figure 14:
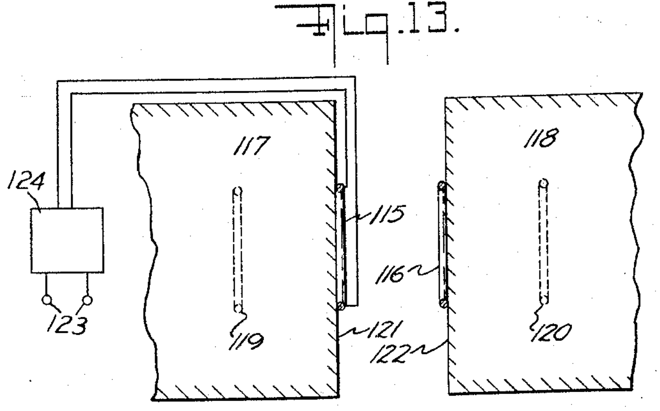
Fig. 14 is an illustration of electrically conducting coils placed adjacent pole faces to compensate for nonhomogeneity of the magnetic field in accordance with the teaching of the present invention.

If it is assumed that the coils 115 and 116 are moved so as to lie on the pole faces 121 and 122 respectively, the images 119 and 120 become congruent, so to speak, as illustrated in Fig. 14.

Connected to a suitable electrical source 123, each coil 115 and 116 has $n$I abamp-turns, and when considered with their respective congruent images, they may be said to have 2$n$I abamp-turns.

$$\frac{\partial^2 Hz}{\partial Z^2} \text{ then} = \frac{192\eta nI}{g3} \beta_{\text{m od}}{}^{\text{d}} \frac{4m^2-\beta^2}{[m^2+\beta^2]^{7/2}}$$

where $$\beta = \frac{2r}{g}$$

$r$=the radius of the coils, and $g$=the air gap.

It should be noted that if $\beta=2$, the total contribution of the first pair of coils is zero. For $\beta=1$, $\Sigma \approx 0.278$, and if we let $$\frac{\partial Hz}{\partial Z^2} = D\frac{nI}{g}$$

it may be calculated that for correction it is required $$\frac{DnI}{g^3} = CK^3 = \frac{4H_0}{g^2} \cdot 7\sqrt{\frac{\eta d}{g}} e - \frac{\eta d}{g}$$

Hence $$nI = \frac{4H_0 g}{D}\left\{7\sqrt{\frac{\eta d}{g}} e - \frac{\eta d}{g}\right\}$$

For example, if $H_0=6000$ gauss, $g=3$ cm., and $\beta=1$, so that $D=186$, then, $$nI=\frac{4\times 6000\times 3}{186}\times 9\times 10^{-5}=0.035 \text{ abamp turns/coil}$$

Thus, for both coils, a total of 0.7 amp turns is required to compensate for lack of homogeneity in the gap due to the finite dimensions of the pole faces. This effect may be achieved by appropriate adjustment of the current control means 124.

Another most important feature of the present invention is that it is so conceived and designed as to lend itself to a type of construction which facilitates the use of machining techniques adapted to finish the pole faces to a degree of flatness heretofore usually only associated with ground optical surfaces. This high degree of flatness further assures that the pole faces of the present invention are equidistant at all points and is another contribution to the high order of homogeneity which may be realized through the use of the present invention.

Additionally, it should be appreciated that the vastly improved homogeneity of magnetic field afforded through the use of the present invention makes it possible to use much smaller and less complex apparatus than that heretofore necessary to produce a comparable order of homogeneity.

Since many changes could be made in the specific combinations of apparatus disclosed herein and many apparently different embodiments of this invention could be made without departing from the scope thereof, it is intended that all matter contained in the foregoing description or shown in the accompanying drawings shall be interpreted as being illustrative and not in a limiting sense.

I claim:

1. A pole cap for improving the homogeneity of a magnetic field comprising a path for the magnetic flux having alternate sections of substantially different orders of permeability disposed perpendicularly to the direction of said flux and being surrounded by a peripheral means coextensive with said sections and having an order of permeability relatively high with respect to the sections of high reluctance.

2. A pole cap for improving the homogeneity of a magnetic field comprising a path for the magnetic flux having alternate sections of substantially different orders of permeability disposed perpendicularly to the direction of said flux, and a magnetic guard ring recessed to receive said alternate sections and having resilient means positioned between the base of said recess and said sections, said magnetic guard ring having a peripheral portion substantially coextensive with said sections.

3. A pole cap for improving the homogeneity of a magnetic field comprising a path for the magnetic flux having alternate sections of substantially different orders of permeability disposed perpendicularly to the direction of said flux, and a magnetic guard ring recessed to receive said alternate sections and having a non-magnetic spring positioned between the base of said recess and said sections, said magnetic guard ring having a peripheral portion substantially coextensive with said sections.

4. A pole cap for improving the homogeneity of a magnetic field comprising a plurality of spaced ferromagnetic discs disposed perpendicularly to the direction of the flux of said magnetic field, the spaces therebetween having substantially higher reluctance than said discs, and the disc positioned as a pole face being accurately machined to substantially an order of optical flatness.

5. A pole cap for improving the homogeneity of a magnetic field comprising a path for the magnetic flux including a base of ferromagnetic material having an annular portion forming a recess therein, a plurality of flat ferromagnetic sections, positioned in said base perpendicularly to the direction of flux of said magnetic field, said sections being bonded thereto and to adjacent sections in spaced relationship by material of substantially high reluctance, and said bonded assembly having a face machined to substantially an order of optical flatness.

6. Means for producing a highly homogeneous magnetic field comprising a magnetomotive source, a yoke of permeable material forming a low reluctance path for the magnetic flux produced by said source, said path having a gap therein, and a pole cap affixed to said yoke on each side of said gap, said pole caps having a plurality of alternately high and low permeability sections disposed perpendicularly to the direction of said magnetic flux.

7. Means for producing a highly homogeneous magnetic field comprising a magnetomotive source, a yoke of permeable material forming a low reluctance path for the magnetic flux produced by said source, said path having a gap therein, and a pole cap affixed to said yoke on each side of said gap, said pole caps having a plurality of alternate layers of high and low permeability material disposed perpendicularly to the direction of said magnetic flux.

8. Means for producing a highly homogeneous magnetic field comprising a magnetomotive source, a yoke of permeable material forming a low reluctance path for the magnetic flux produced by said source, said path having a gap therein, and a pole cap assembly affixed to said yoke on each side of said gap, said pole caps each having a pole face element of a plurality of alternate sections of high and low permeability materials disposed perpendicularly to the direction of said magnetic flux, at least one of said elements being movably mounted in its pole cap assembly, and means for maintaining said pole faces in precisely parallel spaced relation.

9. Means for producing a highly homogeneous magnetic field comprising a magnetomotive source, a yoke of permeable material forming a low reluctance path for the magnetic flux produced by said source, said path having a gap therein, a first pole cap assembly affixed to said yoke on one side of said gap, said pole cap having a plurality of alternate layers of high and low permeability, a second pole cap assembly affixed to said yoke on one side of said gap, said pole cap having a plurality of alternate layers of high and low permeability disposed perpendicularly to the direction of said magnetic flux, a second pole cap assembly including a plurality of similarly disposed alternate layers of high and low permeability material movably supported within said assembly and resilient means positioned to urge the movable element of said second pole cap assembly toward said first pole cap assembly, and nonmagnetic spacing means between said pole cap faces for maintaining a predetermined air gap.

10. Means for producing a highly homogeneous magnetic field comprising a magnetomotive source, a yoke of permeable material forming a low reluctance path for the magnetic flux produced by said source, said path having a gap therein, a pole cap assembly affixed to said yoke at each side of said gap, each of said pole cap assemblies including a plurality of alternate layers of high and low permeability material disposed perpendicularly relative to the direction of magnetic flux and movably supported within said assembly, resilient means positioned to urge its movable element toward the other, and nonmagnetic spacing means between said movable elements for maintaining a predetermined air gap.

11. Means for producing a highly homogeneous magnetic field comprising an element capable of being permanently magnetized, an electrical conductor wound helically around said element whereby to magnetize said element, a yoke of permeable material forming a low reluctance path for the magnetic flux resulting from said magnetization, said path having a gap therein, a pole cap affixed to said yoke on each side of said gap, said pole caps having a plurality of alternately high and low permeability sections disposed perpendicularly to the direction of said magnetic flux, and variable means for passing a relatively small amount of current through said electrical conductor whereby to linearly alter the strength of the magnetic field in said gap.

12. Means for producing a highly homogeneous magnetic field comprising a magnetomotive source, a yoke of permeable material forming a low reluctance path for the magnetic flux produced by said source, said path having a gap therein, a pole cap assembly affixed to each side of said gap, each of said pole cap assemblies including laminated alternate layers of high and low permeability material disposed perpendicularly relative to said magnetic flux and a magnetic guard ring coextensive therewith, at least one of said laminated components being movable and having resilient means associated therewith for urging it toward the other, and quartz spacers positioned between laminated components of said respective assemblies for maintaining a predetermined air gap.

13. Means for producing a highly homogeneous magnetic field comprising a magnetomotive source, a yoke of permeable material forming a low reluctance path for the magnetic flux produced by said source, said path having a gap therein, a pole cap affixed to said yoke on each side of said gap, said pole caps having a plurality of alternate layers of high and low permeability material disposed perpendicularly relative to the direction of said magnetic flux, and a single loop electrically conducting coil positioned against each pole cap face in axial alignment for correcting inhomogeneity of the magnetic field in said gap, the diameter of each coil loop being substantially equal to said gap dimension.

14. Means for compensating for the inhomogeneity of a magnetic field in a gap defined by two pole faces comprising a circular electrical conductor adjacent each pole face within said gap, said conductors being circular in form, said circular form having a diameter substantially equal to said gap dimension, an electrical source connected to said conductors, and means for regulating the flow of current through said conductors.

References Cited in the file of this patent

UNITED STATES PATENTS

| | | |
|---|---|---|
| 1,121,859 | Messiter | Dec. 22, 1914 |
| 1,974,079 | Maier | Sept. 18, 1934 |
| 2,161,977 | Roosenstein | June 13, 1939 |
| 2,283,925 | Harvey | May 26, 1942 |
| 2,390,863 | Amidon et al. | Dec. 11, 1945 |
| 2,394,070 | Kerst | Feb. 5, 1946 |
| 2,664,527 | Reed | Dec. 29, 1953 |

FOREIGN PATENTS

| | | |
|---|---|---|
| 559,526 | Great Britain | Feb. 23, 1944 |
| 492,901 | Canada | May 12, 1953 |